United States Patent
Greenberg et al.

(10) Patent No.: US 10,368,533 B1
(45) Date of Patent: Aug. 6, 2019

(54) SIDETRACKER

(71) Applicant: JB CUSTOM OFFSHORE RIGGING AND FISHING TACKLE INC., Miller Place, NY (US)

(72) Inventors: Benjamin Greenberg, Columbia, SC (US); Justin Braun, Miller Place, NY (US)

(73) Assignee: JB Custom Offshore Rigging and Fishing Tackle Inc., Miller Place, NY (US)

( * ) Notice: Subject to any disclaimer, the term of this patent is extended or adjusted under 35 U.S.C. 154(b) by 0 days.

(21) Appl. No.: 16/356,060

(22) Filed: Mar. 18, 2019

Related U.S. Application Data

(60) Provisional application No. 62/644,536, filed on Mar. 18, 2018.

(51) Int. Cl.
| | |
|---|---|
| *A01K 91/08* | (2006.01) |
| *A01K 91/053* | (2006.01) |
| *A01K 85/10* | (2006.01) |
| *A01K 85/16* | (2006.01) |
| *A01K 85/00* | (2006.01) |

(52) U.S. Cl.
CPC .............. *A01K 85/10* (2013.01); *A01K 85/16* (2013.01); *A01K 91/053* (2013.01); *A01K 91/08* (2013.01); *A01K 85/005* (2013.01)

(58) Field of Classification Search
CPC .............................. A01K 91/08; A01K 91/053
USPC .. 43/43.13, 43.12, 42.74, 44.9, 44.91, 44.87
See application file for complete search history.

(56) References Cited

U.S. PATENT DOCUMENTS

| | | | | |
|---|---|---|---|---|
| 1,361,067 A | * | 12/1920 | Jordan | A01K 85/16 |
| | | | | 43/42.22 |
| 1,361,602 A | * | 12/1920 | Marks | A01K 91/02 |
| | | | | 43/43.13 |
| 1,606,240 A | * | 11/1926 | Klaserner | A01K 93/00 |
| | | | | 43/43.13 |
| 1,782,010 A | * | 11/1930 | Meyer | A01K 91/053 |
| | | | | 43/42.74 |
| 2,789,386 A | * | 4/1957 | Creelman | A01K 91/08 |
| | | | | 43/43.13 |
| 2,877,593 A | * | 3/1959 | Baldridge | A01K 91/053 |
| | | | | 43/42.74 |
| 2,883,787 A | * | 4/1959 | Dahl | A01K 85/16 |
| | | | | 43/42.22 |

(Continued)

FOREIGN PATENT DOCUMENTS

| | | | | | |
|---|---|---|---|---|---|
| GB | 2088681 A | * | 6/1982 | ........ | A01K 91/053 |
| JP | 2557815 B2 | * | 11/1996 | | |
| JP | 2008220182 A | * | 9/2008 | | |

*Primary Examiner* — Darren W Ark
(74) *Attorney, Agent, or Firm* — Sean R. Wilsusen, Esq.

(57) ABSTRACT

A sidetracker includes a body including a first fin and a second fin spaced apart from the first fin. The first and second fins are coupled to the body. The first and second fins are configured to control a vertical position of the body in water through which the body is moving. A channel is formed in the body. The channel includes a first groove and a second groove. The first and second grooves cross each other. A wing is positioned in the channel. The wing is detachably coupled to the body. The wing is configured to rotate between the first groove and the second groove. The wing is configured to control a lateral position of the body in water through which the body is moving.

9 Claims, 6 Drawing Sheets

(56) References Cited

U.S. PATENT DOCUMENTS

| | | | | |
|---|---|---|---|---|
| 2,923,085 A * | 2/1960 | Dahl | A01K 91/08 43/43.13 |
| 2,933,848 A * | 4/1960 | Tollefson | A01K 91/08 43/43.13 |
| 2,935,810 A * | 5/1960 | Giguere | A01K 83/02 43/42.74 |
| 3,003,277 A * | 10/1961 | Vann | A01K 93/00 43/42.22 |
| 3,032,910 A * | 5/1962 | Crossan | A01K 85/12 43/43.13 |
| 3,145,498 A * | 8/1964 | Kochis | A01K 91/06 43/43.13 |
| 3,156,065 A * | 11/1964 | Klammer | A01K 97/00 43/43.13 |
| 3,760,762 A * | 9/1973 | Spongberg | A01K 91/08 114/246 |
| 3,818,624 A * | 6/1974 | Duffy | A01K 91/08 43/43.13 |
| 3,858,344 A * | 1/1975 | Watts | A01K 85/12 43/43.13 |
| 3,908,300 A * | 9/1975 | Kuismi | A01K 91/08 43/43.13 |
| 3,971,153 A * | 7/1976 | Harms | A01K 91/06 43/43.13 |
| 4,461,115 A * | 7/1984 | Carrillo | A01K 93/00 43/43.13 |
| 4,893,432 A * | 1/1990 | Rosengrant | A01K 91/053 43/42.74 |
| 5,185,951 A * | 2/1993 | Hemmerle | A01K 91/08 43/43.13 |
| 5,355,615 A * | 10/1994 | Spickelmire | A01K 91/08 43/43.13 |
| 5,636,467 A * | 6/1997 | Adams | A01K 91/08 43/42.22 |
| 6,055,765 A * | 5/2000 | Ruppa | A01K 91/08 43/43.13 |
| 7,412,795 B2 * | 8/2008 | Glynn | A01K 91/04 43/42.74 |
| 8,572,887 B2 * | 11/2013 | Adelman | A01K 91/053 43/42.06 |
| 9,591,840 B2 * | 3/2017 | LeHew | A01K 91/053 |
| 9,930,876 B2 * | 4/2018 | Solberg | A01K 93/00 |
| 10,130,086 B2 * | 11/2018 | Adelman | A01K 91/08 |
| 2008/0313949 A1 * | 12/2008 | Lee | A01K 91/08 43/43.13 |
| 2010/0058641 A1 * | 3/2010 | Lee | A01K 91/08 43/17 |
| 2013/0133241 A1 * | 5/2013 | Barker | A01K 97/02 43/44.9 |
| 2018/0360013 A1 * | 12/2018 | Breunig | A01K 91/08 |

* cited by examiner

SIDETRACKER

CROSS-REFERENCE TO RELATED APPLICATION

This U.S. Non-Provisional patent Application claims priority to U.S. Provisional Patent Application No. 62/644,536, filed on Mar. 18, 2018, the disclosure of which is incorporated by reference herein in its entirety.

TECHNICAL FIELD

The present disclosure relates to a sidetracker, and more particularly to a sidetracker for trolling a fishing lure.

BACKGROUND

There are many methods for catching fish including spear fishing, netting, angling and trapping. Commercial fishermen often use netting methods involving trapping many fish in a large net that is pulled behind a boat. Recreational fishermen generally use the angling method, though other methods such as spear fishing are also done for recreational purposes.

Angling is a method of fishing that involves the fish biting onto a baited hook which becomes lodged in the fish's mouth. The baited hook is attached to a fishing line which is generally attached to a rod or pole. The fishing rod or pole is generally fitted with a fishing reel that functions as a mechanism for storing and retrieving the line. To entice the fish to bite onto the hook, either a natural or artificial bait (lure) is attached to the hook.

Lures are artificial baits that are designed to entice fish to strike the hook. Lures typically mimic the natural prey or food of the species of fish which the fisherman seeks to capture. The lure may use visual appearance, such as shape or color, attract the fish. The lure may also mimic the movement of the fish's typical prey to entice the fish to bite the hook. There are many different types of lures, which can be used alone or in combination with other lures. Lures can be made of many different materials, such as wood, plastic, rubber, metals, feathers, animal hair, etc.

SUMMARY

The present disclosure relates to fishing lures designed to be used in offshore sportfishing, sometimes referred to a deep-sea fishing, salt water fishing or big-game fishing. The fisherman engaging in this type of fishing is generally seeking to catch large fish such as swordfish, marlin, tuna and sharks.

An exemplary embodiment of the present disclosure provides a fishing sidetracker including a body including a first fin and a second fin spaced apart from the first fin. The first and second fins are coupled to the body. The first and second fins are configured to control a vertical position of the body in water through which the body is moving. A channel is formed in the body. The channel includes a first groove and a second groove. The first and second grooves cross each other. A wing is positioned in the channel. The wing is detachably coupled to the body. The wing is configured to rotate between the first groove and the second groove. The wing is configured to control a lateral position of the body in water through which the body is moving.

According to an exemplary embodiment of the present disclosure, the channel may be formed in a bottom surface of the body.

According to an exemplary embodiment of the present disclosure, the first groove and the second groove may form an X-shape.

According to an exemplary embodiment of the present disclosure, the first groove and the second groove may respectively extend at substantially equal and opposite angles with respect to a central axis of the body.

According to an exemplary embodiment of the present disclosure, the channel may be formed between the first fin and the second fin.

According to an exemplary embodiment of the present disclosure, the fishing sidetracker may include a screw extending through a central region of the wing to detachably couple the wing to the body.

According to an exemplary embodiment of the present disclosure, the fishing sidetracker may include a release tab in communication with the screw. The release tab may be configured to allow the wing to rotate between the first groove and the second groove.

According to an exemplary embodiment of the present disclosure, the body may have a torpedo shape.

According to an exemplary embodiment of the present disclosure, a hole may be formed through the body. The hole may be configured to secure fishing lures to the body.

According to an exemplary embodiment of the present disclosure, a hole may extend through a central axis of the body from a front of the body.

BRIEF DESCRIPTION OF THE FIGURES

The above and other features of the present disclosure will become more apparent by describing in detail exemplary embodiments thereof, with reference to the accompanying drawings, in which.

DETAILED DESCRIPTION

Figure 1:
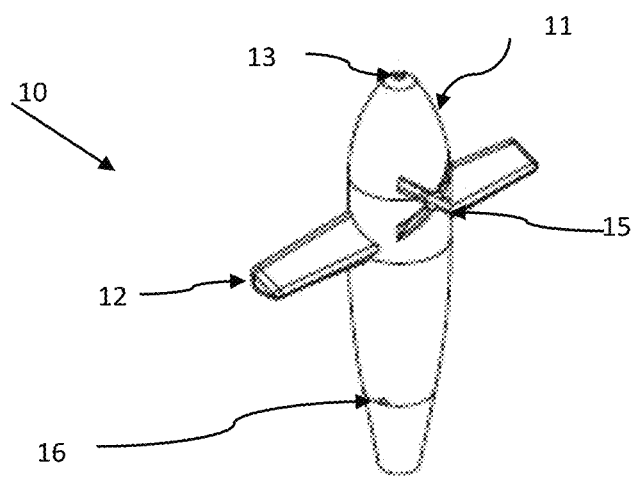
FIG. 1 is an isometric view of the main body (10) of the fishing sidetracker showing the torpedo shaped body (11), the fins (12), the X-shaped channel (15) and the hole (16) for affixing a thin metal rod with trailing smaller lures.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

As used herein, the terms parallel and perpendicular are understood to include relative configurations that are substantially parallel and substantially perpendicular up to about + or −10 degrees from true parallel and true perpendicular.

It will be understood that when an element is referred to as being "on", "attached" to, "connected" to, "coupled"

with, "contacting", etc., another element, it can be directly on, attached to, connected to, coupled with or contacting the other element or intervening elements may also be present.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

The fishing sidetracker disclosed in this application is a fishing lure for use in combination with other lures to attract the type of fish sought in deep-sea fishing, such as marlin, tuna and sharks. The fishing sidetracker may include a main torpedo like body and one or more wings which affix to the bottom of the main body to form a rotor. Additional smaller lures may be arranged behind the fishing sidetracker by means of attachment using a thin metallic rod or stiff wire which traverses the torpedo shaped body. When the fishing boat is in motion and pulling the lures through the water, the wing mounted on the bottom of the torpedo shaped body keeps the lure to the left or right of the boat and out of the turbulence caused by the boats motor. The fins on either side of the main body assist in aiding the lure to aim for the surface of the water as the lure is being pulled through the water.

Figure 2:
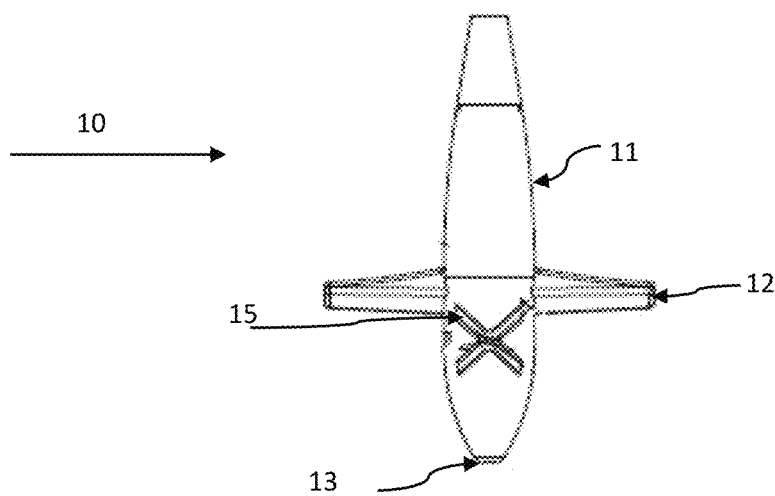
FIG. 2 is view of the bottom of the main body of the fishing sidetracker illustrated in FIG. 1.
Figure 3:
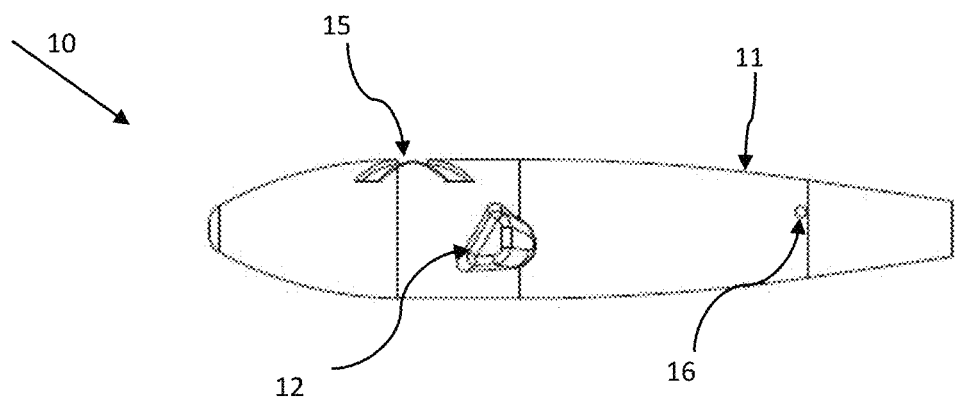
FIG. 3 is a side view of the main body of the fishing sidetracker illustrated in FIG. 1.
Figure 4:
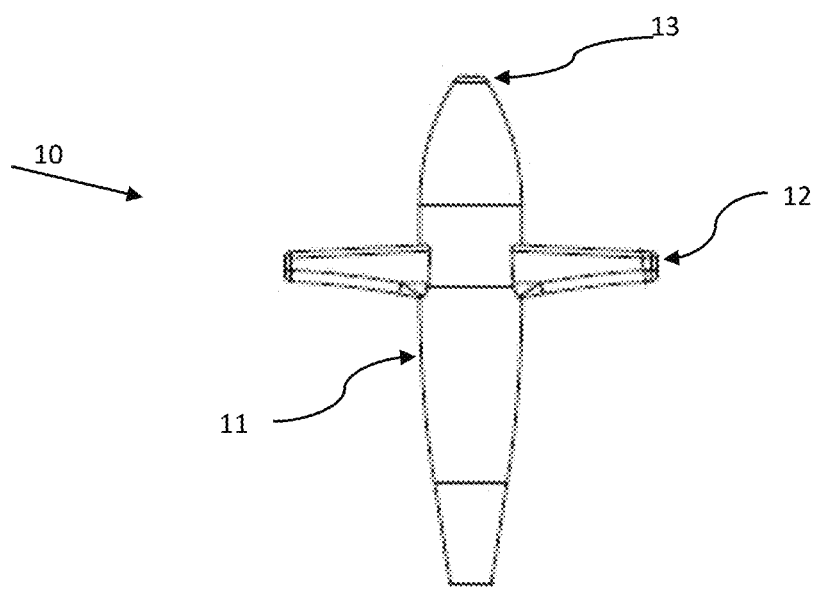
FIG. 4 is a view of the top of the fishing sidetracker illustrated in FIG. 1.
Figure 5:
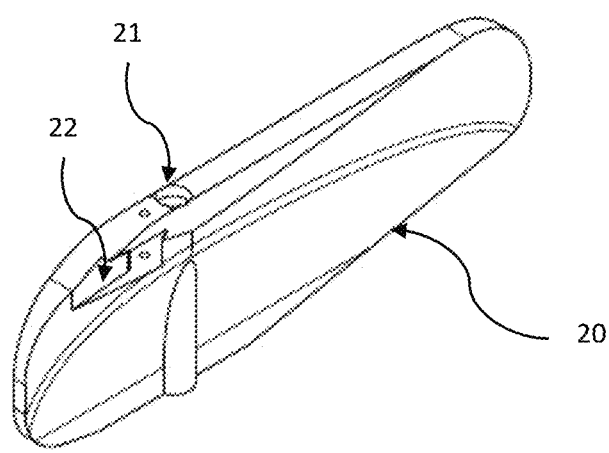
FIG. 5 is a view of one of the wings (20) which is detachably coupled to the main body (10) of the fishing sidetracker illustrated in FIG. 1 via the X-shaped channel (15).
Figure 6:
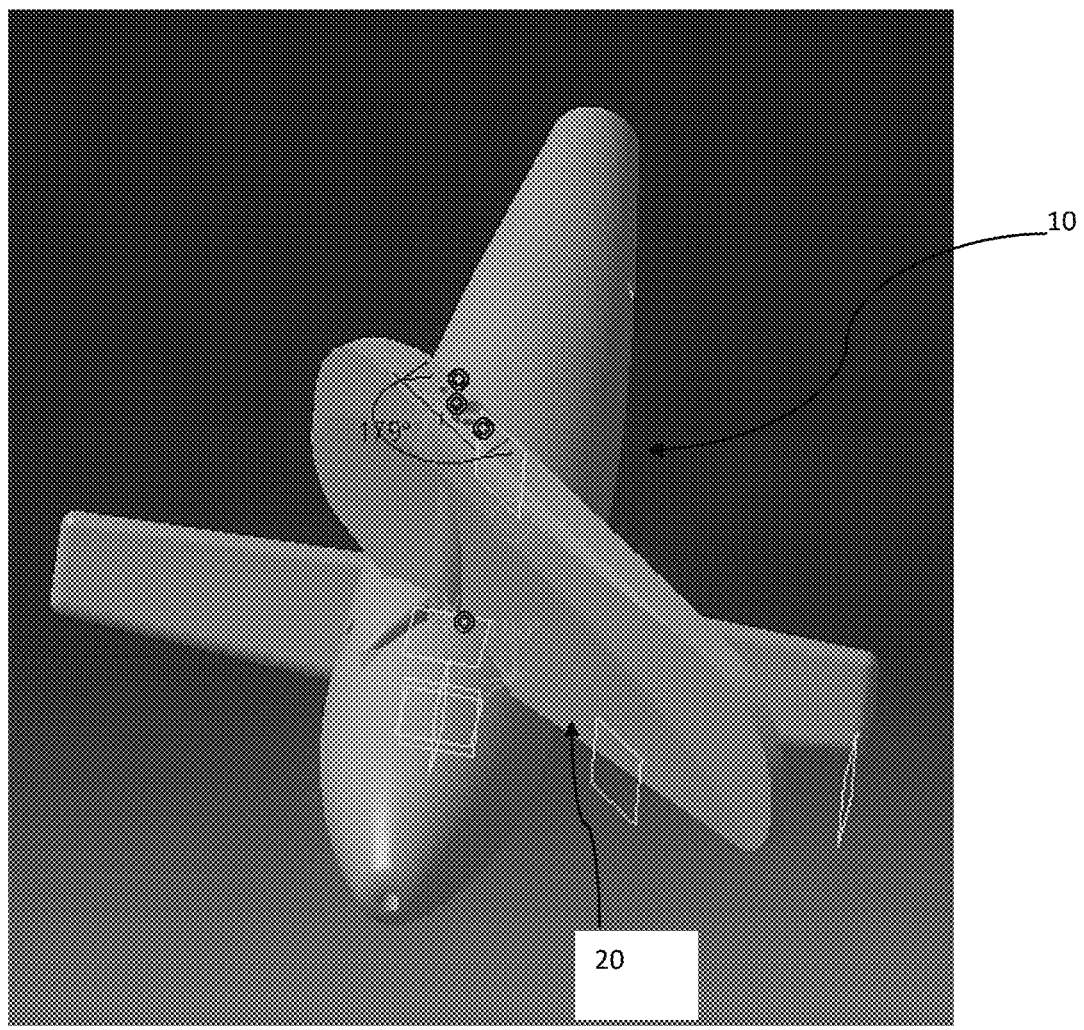
FIG. 6 is a view of the main body (10) to which one of the wings (20) has been detachably coupled in the fishing sidetracker illustrated in FIG. 1.

FIG. 1 is an isometric view of the main body (10) of the fishing sidetracker showing the torpedo shaped body (11), the fins (12), the X-shaped channel (15) and the hole (16) for affixing a thin metal rod with trailing smaller lures. FIG. 2 is view of the bottom of the main body of the fishing sidetracker illustrated in FIG. 1. FIG. 3 is a side view of the main body of the fishing sidetracker illustrated in FIG. 1. FIG. 4 is a view of the top of the fishing sidetracker illustrated in FIG. 1. FIG. 5 is a view of one of the wings (20) which is detachably coupled to the main body (10) of the fishing sidetracker illustrated in FIG. 1 via the X-shaped channel (15). FIG. 6 is a view of the main body (10) to which one of the wings (20) has been detachably coupled in the fishing sidetracker illustrated in FIG. 1. The terms 'body' and 'main body' may be used interchangeably herein.

Referring to FIGS. 1 to 6, according to an exemplary embodiment of the present disclosure, the fishing sidetracker includes the main body (10) and the wing (20) which affixes (e.g., is detachably coupled) to the bottom of the main body (10).

According to an exemplary embodiment of the present disclosure, the main body (10) of the fishing sidetracker may include a torpedo shaped body (11) from which two fins (12) are affixed. A fishing line is connected to the front of the body (13) to allow the fishing sidetracker to be pulled through the water by a fishing boat. On the bottom of the torpedo shaped body (11) is a deep channel in the shape of an X (15) which is for the attachment of the wing (20) to the main body (10). The channel (15) is X-shaped to allow for the wing to be positioned in more than one orientation with respect to the main body (10).

According to an exemplary embodiment of the present disclosure, the wing (20) is not a permanent part of the main body (10) to allow for different shapes of wings to be utilized for varying dynamics of motion in the water. Thus, the wing (20) may be removed and replaced with a wing having a different size, shape, directional orientation, material composition and/or weight.

According to an exemplary embodiment of the present disclosure, toward the rear of the main body (10) is a small hole (16) which traverses the torpedo shaped body (11). This hole (16) is used for attaching a thin metallic rod (e.g., a 'spreader bar') or stiff metal wire to the fishing sidetracker for pulling one or more lures. Additional smaller lures are affixed to the metal rod via fishing line or thin wires and are thus pulled along behind the fishing sidetracker when it is pulled through the water. These smaller lures may be any number of commercially available lures or lures made by the fisherman.

According to an exemplary embodiment of the present disclosure, a fishing sidetracker includes a body (10) including a first fin and a second fin spaced apart from the first fin (see, e.g., fins (12) illustrated in FIGS. 1-4 and 6). The first and second fins are coupled to the body (10). The first and second fins are configured to control a vertical position of the body (10) in water through which the body (10) is moving. A channel (15) is formed in the body (10). The channel (15) includes a first groove and a second groove (see, e.g., channel (15) illustrated in FIGS. 1-3). The first and second grooves cross each other. A wing (20) is positioned in the channel (15) (e.g., in the first groove or the second groove of the channel (15)). The wing (20) is detachably coupled to the body (10). The wing (20) is configured to rotate between the first groove and the second groove. The wing (20) is configured to control a lateral position of the body (10) in water through which the body (10) is moving. The wing (20) may be interchangeably referred to and understood as a 'keel' or a 'rudder' which controls a direction in which the fishing sidetracker is directed when pulled behind a boat. The use of the wing (20) allows the fishing sidetracker to be pulled to the sides of a boat to increase an amount of space in a spread of trolling lures behind the boat.

According to an exemplary embodiment of the present disclosure, the channel (15) may be formed in a bottom surface of the body (10). As an example, if the fishing sidetracker is pulled behind a boat (e.g., in an ocean, lake or river), the channel (15) may face a bottom of the ocean, lake or river so that contact is maintained between the wing (20) and the water through which it is traveling. Thus, a lateral position of the fishing sidetracker in a trolling spread may be controlled.

According to an exemplary embodiment of the present disclosure, the first groove and the second groove may form an X-shape. According to an exemplary embodiment of the present disclosure, the first groove and the second groove of the channel (15) may respectively extend at substantially equal and opposite angles with respect to a central axis of the body (10). This allows the fishing sidetracker to take on left or ride side orientation in which the fishing sidetracker is pulled toward a left or right side of a boat based on which groove of channel (15) that the wing (20) is positioned. Exemplary embodiments of the present disclosure are not limited to a particular number or position of grooves of the channel (15). For example, additional grooves may be added to create a desired angle between the wing (20) and a central axis of the body (10). Alternatively, a groove extending along the central axis of the body (10) may be employed to direct the fishing sidetracker directly behind a center of a boat pulling the fishing sidetracker.

According to an exemplary embodiment of the present disclosure, the channel (15) may be formed between the first fin and the second fin. For example, the channel (15) may be formed between the first and second fins, while also being positioned toward a front region of the fishing sidetracker. The front of the fishing sidetracker may be a part of the fishing sidetracker facing in a direction of travel of the boat pulling the fishing sidetracker.

According to an exemplary embodiment of the present disclosure, the fishing sidetracker may be coupled to or may be an integral part of a spreader bar used for trolling lures, such as artificial lures. Live bait may also be incorporated into hooks or lures associated with a spreader bar.

According to an exemplary embodiment of the present disclosure, the fishing sidetracker may include a screw (21) extending through a central region of the wing (20) to detachably couple the wing (20) to the body (10) (see, e.g., FIGS. 5 and 6). The screw (21) may allow the wing (20) to lift out of the first groove and rotate into position in the second groove. According to an exemplary embodiment of the present disclosure, the fishing sidetracker may include a release tab (22) in communication with the screw (21), the release tab (22) configured to contact a lateral surface of the screw (21). The screw (21) may be configured to allow the wing (20) to rotate between the first groove and the second groove (e.g., after being lifted slightly out of the first groove and rotated while remaining attached to the body (10) via the screw (21)). As an example, the release tab (22) may fold out of an indent in the wing (20) to release tension between the screw (21) and the wing (20). The wing (20) may then be rotated and the release tab (22) may then be returned to its original position to restore tension between the screw (21) and the wing (20), thus securing the wing (20) in whichever groove of channel (15) in which the wing (20) is positioned.

According to an exemplary embodiment of the present disclosure, the body (10) may have a torpedo shape. However, exemplary embodiments of the present disclosure are not limited thereto and the body (10) may have other shapes, as desired (e.g., other streamlined shapes configured to glide through water).

According to an exemplary embodiment of the present disclosure, a hole (16) may be formed through the body (10). The hole (16) may be configured to secure fishing lures to the body (10). For example, a spreader bar may be secured to the body (10) through hole (16).

According to an exemplary embodiment of the present disclosure, a hole (see, e.g., the hole formed in the front (13) of body (10)) may extend through a central axis of the body (10) from the front (13) of the body (10). The hole may extend entirely through the body (10) along the central axis of the body (10) such that fishing line may extend entirely through the body (10).

The fishing sidetracker described herein may be formed of plastic (e.g., by utilizing 3-D printing); however, exemplary embodiments of the present disclosure are not limited thereto, and other materials and/or manufacturing methods may be employed, as desired.

The disclosures of each of the references, patents and published patent applications disclosed herein are each incorporated by reference herein in their entireties.

In the event of a conflict between a definition herein and a definition incorporated by reference, the definition provided herein is intended.

Having described exemplary embodiments of the present disclosure, it is further noted that it is readily apparent to those of ordinary skill in the art that various modifications may be made without departing from the spirit and scope of the present disclosure.

What is claimed is:

1. A fishing sidetracker, comprising:
 a body including a first fin and a second fin spaced apart from the first fin, the first and second fins coupled to the body and configured to control a vertical position of the body in water through which the body is moving;
 a channel formed in the body, the channel including a first groove and a second groove, the first and second grooves crossing each other; and
 a wing positioned in the channel, the wing having a height extending away from the body, the wing rotatably coupled to the body by a screw extending through the wing along a direction parallel to the height of the wing, the wing configured to rotate between the first groove and the second groove, the wing configured to control a lateral position of the body in water through which the body is moving.

2. The fishing sidetracker of claim 1, wherein the channel is formed in a bottom surface of the body.

3. The fishing sidetracker of claim 2, wherein the first groove and the second groove form an X-shape.

4. The fishing sidetracker of claim 3, wherein the first groove and the second groove respectively extend at substantially equal and opposite angles with respect to a central axis of the body.

5. The fishing sidetracker of claim 4, wherein the channel is formed between the first fin and the second fin.

6. The fishing sidetracker of claim 1, wherein the body has a torpedo shape.

7. The fishing sidetracker of claim 1, further comprising a hole formed through the body, the hole configured to secure fishing lures to the body.

8. The fishing sidetracker of claim 1, further comprising a hole extending through a central axis of the body from a front of the body.

9. The fishing sidetracker of claim 1, wherein the wing is configured to rotate about the screw between the first groove and the second groove while remaining coupled to the body by the screw.

* * * * *